United States Patent [19]

Jasmine

[11] 4,007,419
[45] Feb. 8, 1977

[54] DIGITAL BICYCLE SPEEDOMETER-ODOMETER

[76] Inventor: Richard Jasmine, 3320 Delmonte Blvd., Space 43, Marina, Calif. 93933

[22] Filed: Oct. 2, 1975

[21] Appl. No.: 618,810

[52] U.S. Cl. .......................... 324/166; 235/92 EA; 235/92 FQ
[51] Int. Cl.² .......................................... G01P 3/48
[58] Field of Search .......................... 324/166–171, 324/78 D, 164; 235/92 FQ, 92 TF, 92 EA

[56] References Cited
UNITED STATES PATENTS

| | | | |
|---|---|---|---|
| 3,603,769 | 9/1971 | Malcolm | 235/92 DP |
| 3,710,246 | 1/1973 | Herring | 324/162 |
| 3,748,580 | 7/1973 | Stevens et al. | 324/178 |
| 3,835,382 | 10/1974 | Weisbart | 324/161 |
| 3,863,153 | 1/1975 | Eshraghian | 324/166 |
| 3,868,570 | 2/1975 | Kopera, Jr. | 324/166 |
| 3,887,795 | 6/1975 | Eyrick et al. | 235/92 EA |

*Primary Examiner*—R. V. Rolinec
*Assistant Examiner*—Vincent J. Sunderdick
*Attorney, Agent, or Firm*—Boone, Schatzel, Hamrick & Knudsen

[57] ABSTRACT

A combination speedometer/odometer apparatus for displaying either the speed of a vehicle or the distance a vehicle has traveled, and including a speed pick-up attached to the vehicle for developing a first voltage signal having voltage spikes occurring at a frequency proportional to the speed of the vehicle; a pulse generator which develops a voltage pulse in response to each spike, the pulses having a predetermined duration; a signal generator controlled by the voltage pulses which develops a speed signal and a distance signal both having bursts of high-frequency signal, the number of bursts in the speed signal being proportional to the speed of the vehicle and the number of bursts in the distance signal being proportional to the total distance the vehicle has traveled; a first counter for counting the cycles of the speed signal, the counter initiating its count in response to a reset signal; a synchronizer for developing the reset signal a predetermined period of time after the occurrence of one of the voltage pulses; a second counter for counting the cycles of the distance signal; and a display for visually displaying the count of the first or second counter, thus indicating speed of the vehicle or the distance the vehicle has traveled.

10 Claims, 4 Drawing Figures

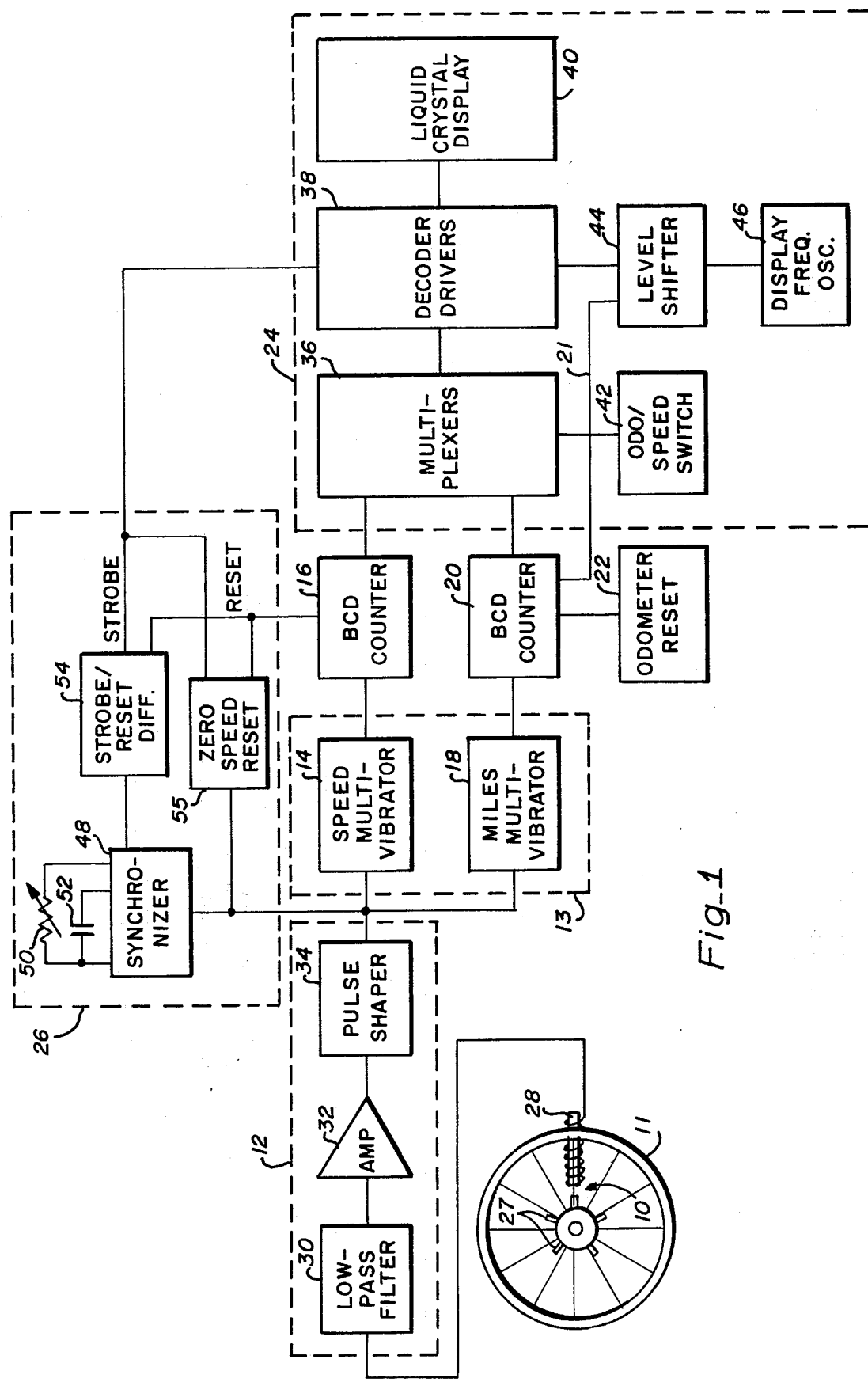
Fig_1

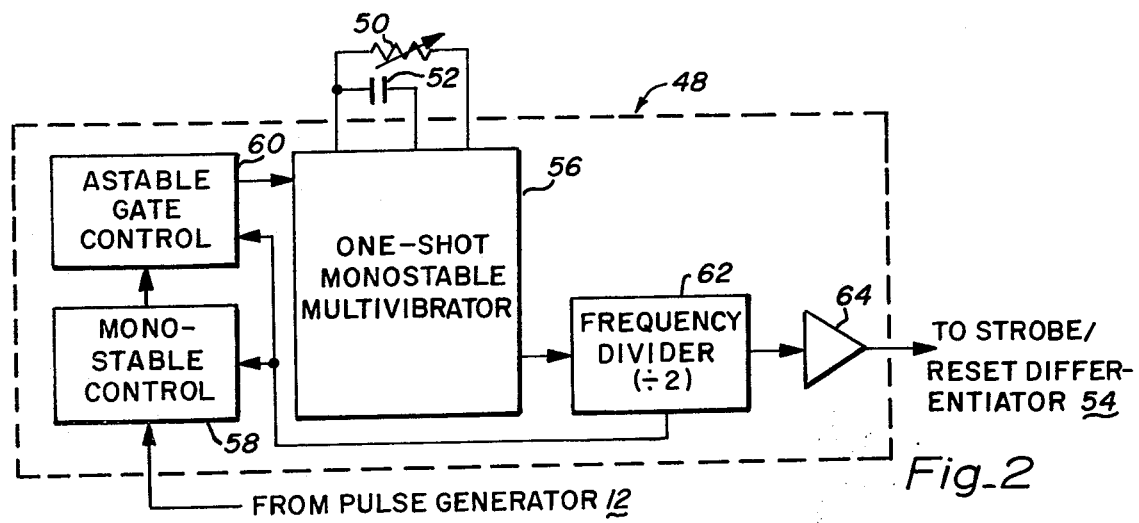
Fig_2
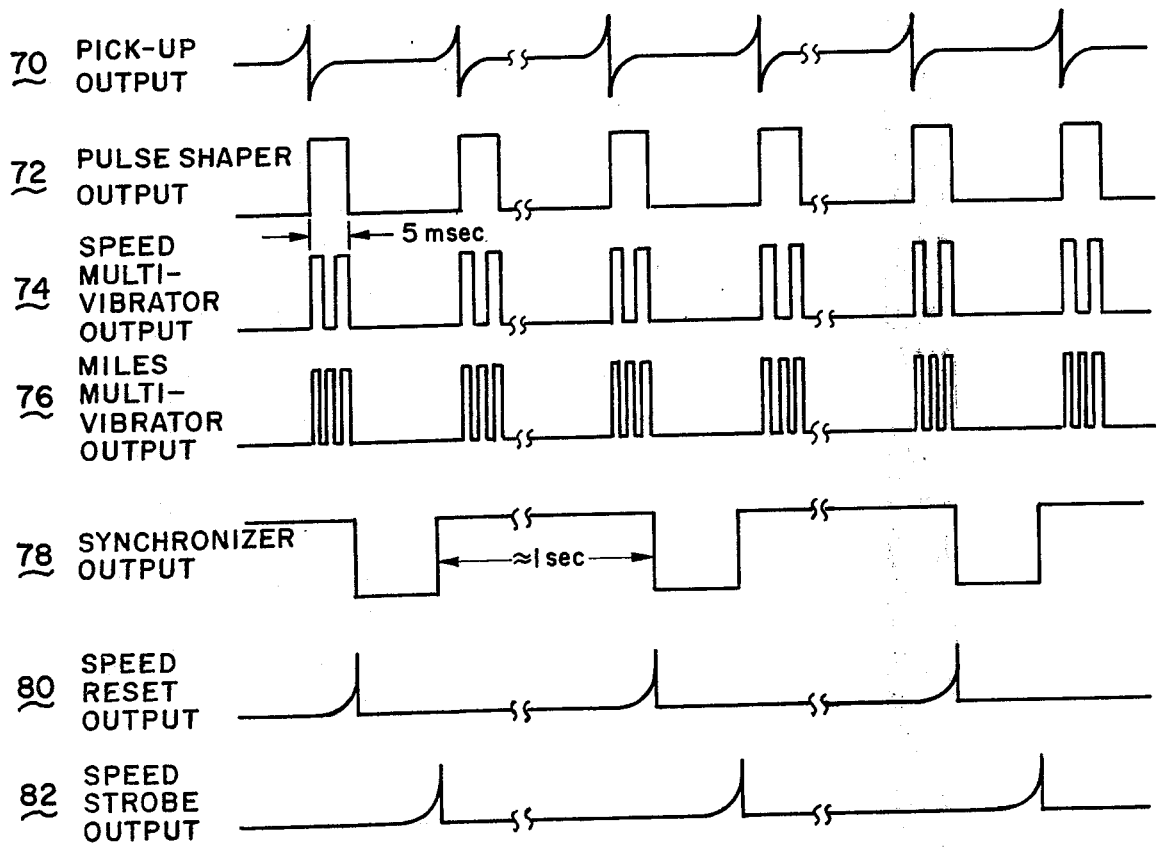
Fig_3
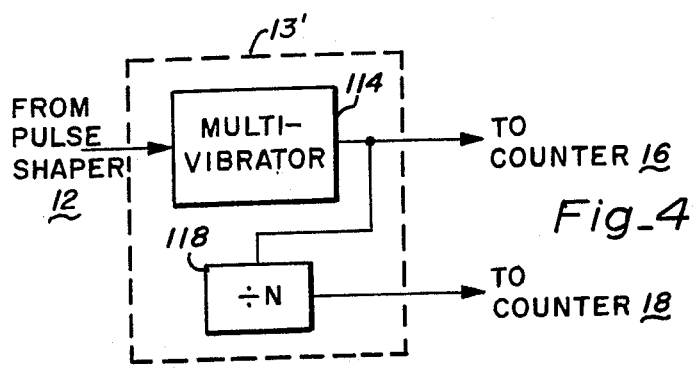
Fig_4

DIGITAL BICYCLE SPEEDOMETER-ODOMETER

BACKGROUND OF THE INVENTION

1. Field of the Invention

The present invention relates generally to electrical speed and distance measuring devices and more particularly, to a combination speedometer/odometer for use on bicycles, motorcycles or similar vehicles having no, or limited, electrical power generating capabilities.

2. Description of the Prior Art

It is often times important for the bicycle or motorcycle rider to know accurately how fast he is going or how far he has traveled. However, it is also important that any speedometer/odometer device not impede the speed of the vehicle by burdening the drive system with electrical power generating or mechanical speed indicating equipment. The present invention provides an electronic, low power, accurate, combination speedometer/odometer needing no external power input.

Combination speedometer/odometers are known in the prior art. Examples of such devices are disclosed to Kopera, U.S. Pat. No. 3,868,570; Perron, U.S. Pat. No. 3,746,985; Masters, U.S. Pat. No. 3,477,022; and Ho et al., U.S. Pat. No. 3,396,333. Although each of these disclose a combination speedometer/odometer all suffer from such disadvantages as lack of accuracy at low speeds, high power consumption or both.

SUMMARY OF THE PRESENT INVENTION

It is therefore a principal object of the present invention to provide a combination speedometer/odometer which is accurate at low as well as high speeds.

It is another object of the present invention to provide a bicycle speedometer/odometer which is self-contained and requires only a small amount of electrical energy to operate.

Briefly, the present invention includes an electromechanical pick-up for developing electrical voltage spikes whose frequency is commensurate with vehicle speed; a pulse generator for converting the spikes into a voltage signal having uniform duration voltage pulses; a signal generator controlled by the voltage signal and operative to develop a speed indicating signal and a distance indicting signal; two binary-coded decimal counters for counting the cycles of the speed signal and the cycles of the distance signal; a synchronizer circuit for synchronizing the speed indicating circuitry with the electro-mechanical pick-up; a strobe/reset circuit for resetting the speed counter so as to constantly monitor the speed of the vehicle, and for strobing the display means to display speed or distance; a switch for determining in which mode the device operates; and a display circuit for displaying either the speed of the vehicle or the distance the vehicle has traveled on a set of seven segment digital liquid crystal displays.

In the preferred embodiment, the pulse generator, signal generator, counters and synchronizer are comprised of CMOS integrated circuits which require very little electrical power to operate. Similarly, the liquid crystal display requires very little power to display either speed or distance information.

An advantage of the present invention is that the speedometer/odometer is accurate over a wide range of speeds.

Another advantage of the present invention is that it is self-contained and requires no electrical or mechanical power from the vehicle.

A further advantage is that the present invention can be made from readily available electronic components.

These and other objects and advantages of the present invention will no doubt become apparent after having read the following detailed description of the preferred embodiment which is illustrated in the several figures of the drawing.

In The Drawing:

FIG. 1 is a block diagram generally illustrating the principal components of a speedometer/odometer in accordance with the present invention;

FIG. 2 is a block diagram and partial schematic illustration of the components of the synchronizer portion of the circuit of FIG. 1;

FIG. 3 is a timing diagram schematically illustrating operation of the circuit shown in FIG. 1; and FIG. 4 is an alternate embodiment of the signal generator used in the present invention.

DETAILED DESCRIPTION OF THE PREFERRED EMBODIMENT

Referring now to FIG. 1 of the drawing, a block diagram is shown generally illustrating principal components of a speedometer/odometer in accordance with the present invention. The system includes a speed pick-up 10 for developing voltage spikes as a wheel 11 rotates; a pulse-generating circuit 12 for converting the spikes into a voltage signal having uniform voltage pulses of a predetermined duration; a signal generator 13 for generating a speed-indicating signal and a distance indicating signal in response to the pulse from pulse generator 12; a binary-coded decimal counter 16 for counting the cycles of the speed-signal; a binary-coded decimal counter 20 for counting the cycles of the distance signal and for developing a signal on line 21 when a count of one-hundred or more is reached; an odometer reset switch 22 for resetting the odometer counter 20 to zero; a display circuit for displaying either the speed of the vehicle or the distance the vehicle has traveled; and a synchronizer-differentiator circuit 26 for synchronizing the count of speed counter 16 with pick-up 10 and for causing speed or distance to be displayed.

Speed pick-up 10 can be an electro-magnetic or other type of device which develops voltage signals having a frequency proportional to vehicle speed. The device shown in FIG. 1 includes five magnets 27 and an electrical coil 28. As each magnet 27 approaches coil 28 the magnetic flux of the magnet causes a positive voltage to develop in coil 28. When the magnet passes by coil 28 the direction of the flux is reversed, causing the voltage developed in coil 28 to become negative. This results in a signal being developed having a series of positive and negative voltage spikes (see waveform 70 in FIG. 3).

These voltage spikes are fed into pulse generator 12 which has a low pass filter 30 for eliminating high frequency noise, in series with an amplifier 32 for amplifying the voltage spikes, and a pulse shaper 34 for developing a uniform duration pulse for each voltage spike from coil 28.

Signal generator 13 has a multivibrator 14 for developing the speed indicating signal and a multivibrator 18 for developing the distance indicating signal. Multivibrators 14 and 18 develop signals having frequencies much greater than the frequency of the pulses developed by pulse generator 12. Since the on-times of multivibrators 14 and 18 are controlled by the pulses from pulse generator 12, the signals output from multivibrators 14 and 18 are trains of bursts of a relatively high-frequency signal having a duration equal to the pulse duration. It is these high-frequency signals which are counted by counters 16 and 20 and ultimately determine the speed and distance readouts.

Display circuit 24 includes a set of multiplexers 36 for outputting binary coded decimal information from either counter 16 or 20, a set of decoder drivers 38 for converting the binary coded decimal information from multiplexers 36 into decimal information, a liquid crystal display 40 for displaying three, seven-segment digits according to the decimal information from decoder-drivers 38, a speedometer/odometer switch 42 for determining whether speed or distance information is output from multiplexers 36, a level shifter 44, for alternatively shifting the liquid crystal display supply voltage from a positive to a negative value and for energizing the hundreds digit in response to a signal on line 21, and a display frequency oscillator 46 for controlling level shifter 44.

BCD counters 16 and 20 feed into opposite sides of the multiplexers 36 and switch 42 determines which side of multiplexers 36 feeds into decoder drivers 38. When decoder drivers 38 are strobed by the strobe signal from synchronizer 26, the information received by decoder drivers 38 from multiplexers 36 is displayed on the liquid crystal display 40. Thus, either the speed of the vehicle or the distance traveled may be alternately displayed in three, seven-segment digits depending on the position of switch 42. The supply voltage to display 40 is shifted from a positive to a negative voltage by level shifter 44 and oscillator 46 to prevent electrolysis from occurring. Electrolysis would severely inhibit the life of display 40.

In operation, the magnets 27 are attached to the rotating wheel of a vehicle while coil 28 is mounted on the frame or some other nonmoving portion of the vehicle. Voltage spikes developed in coil 28 (as previously described) are filtered by filter 30, amplified by amplifier 32, and converted into 5 millisecond pulses by pulse shaper 34. These 5 millisecond pulses are fed into multivibrators 14 and 18 of signal generator 13 and control their on-time, resulting in signals being generated by multivibrators 14 and 18 which are time coincident with the pulses.

Synchronizer-differentiator circuit 26 includes a synchronizer 48, a strobe/reset differentiator 54, and a zero speed reset 55. Synchronizer 48 has two external components, an adjustable resistor 50 and a capacitor 52, whose purpose will be explained below. Signals from pulse generator 12 are fed into synchronizer 48 and trigger a timing signal. This timing signal is converted by the strobe/reset differentiator 54 into a speed counter reset signal for resetting counter 16 and a strobe signal for strobing decoder drivers 38. A uniform timing period is thus developed during which counter 16 counts the signal from multivibrator 14, and immediately after which the count is displayed. It should be appreciated that since synchronizer 48 is activated by a signal from pulse generator 12, which is in turn dependent upon the voltage spikes received from speed indicator 10, that the timing period will always begin when magnets 27 are in the same position relative to coil 28. This relationship eliminates the possibility that successive timing periods will begin when the magnets are in different relative positions with respect to coil 28 which could result in an inaccurate and unstable count, particularly during slow vehicle speeds.

Zero speed reset 55 functions in the synchronizer circuit 26 to reset counter 16 to zero when pulse generator 12 stops developing pulses. When wheel 27 stops turning, pulses from generator 12 will also stop. However, counter 16 could be at a count level other than zero. It is necessary to reset counter 16 and strobe drivers 38 at this time so that the last count of counter 16 will not be continuously displayed. Zero reset 55 monitors the signal from generator 12 and develops the necessary reset and strobe signals when a predetermined length of time has elapsed without the occurrence of a pulse.

FIG. 2 shows that gate and synchronizer 48 includes a one-shot monostable multivibrator 56, a control circuit comprised of a monostable control 58, an astable gate control 60, and an output circuit having a frequency divider 62 and a buffer 64. The signal from pulse generator 12 is fed into the monostable control 58 which in turn causes a control signal to be developed by astable gate control 60. This control signal activates one-shot 56 which develops a rectangular pulse of a predetermined duration. The rectangular pulse is halved by divider 62 and output to differentiator 54 by buffer 64.

Additionally, attached to synchronizer 48 are two discrete components, adjustable resistor 50 and capacitor 52. These elements determine the duration of the timing signal developed by synchronizer 48 in accordance with their RC time constant. Thus, it should be appreciated that by varying the resistance of resistor 50 the duration of the timing signal can be changed making the present invention adjustable for use on any of several vehicles having different size wheels.

FIG. 3 depicts the various waveforms of signals as seen throughout the circuit of FIG. 1. Waveform 70 represents the output signal from coil 28 which is in the form of a series of voltage spikes. The first or positive portion of the spikes is developed by the sudden build up of voltage inducing flux in coil 28 as a magnet 27 approaches coil 28. As the magnet 27 passes by the central axis of coil 28, the flux therein begins decreasing rapidly causing an initial negative voltage spike which increases toward a zero voltage level as magnet 27 travels away from coil 28. These voltage spikes are fed into pulse generator 12 which develops a signal as in waveform 72. This signal includes a pulse train with pulses having a duration of 5 milliseconds which control the on-time of multivibrators 14 and 18. The signals developed by multivibrators 14 and 18, as in waveforms 74 and 76, respectively, consist of bursts of a frequency signal which last 5 milliseconds. It is the cycles of the signal in these bursts which are counted by counters 16 and 20, and result in the speed and distance readouts, respectively.

Waveform 78 represents the output of synchronizer 48 which is a squarewave pulse having a duration determined by adjustable resistor 50 and capacitor 52. This pulse is fed into strobe reset differentiator 54 which develops two signals. The positive going edge of the synchronizer 48 output (waveform 78) is processed by strobe/reset differentiator 54 to develop a reset voltage spike for each such edge. Similarly, strobe/reset differentiator 54 develops the strobe pulses represented in waveform 82 in response to the negative going edges of the synchronizer 48 output signal. It should be noted that the strobe pulses represented in waveform 82 occur a short time before the reset pulses represented in waveform 80 so that decoder drivers 28 output the speed information from multiplexers 36 to display 40 a short time before counter 16 is reset. Shortly after the strobe pulse, synchronizer 48 will receive a 5 millisecond pulse from pulse generator 12 which will cause synchronizer 48 to develop another timing signal. The leading edge of this signal will cause counter 16 to reset and begin counting the speed signal, starting at zero, until the trailing edge of the timing signal again occurs which will cause the count at that time to be displayed. Thus, the speed measurement is updated at the termination of each timing signal, which in the preferred embodiment occurs approximately every second.

FIG. 4 depicts an alternate embodiment of signal generator 13. As shown, generator 13' may be comprised of a single multivibrator 114 and a signal frequency divider 118. In this embodiment, the output of multivibrator 114 is controlled by the signal from pulse shaper 12 and provides the input to counter 16 and divider 118. Divider 118 divides the multivibrator signal by an appropriate divisor, in this embodiment divider 118 divides by 10, and develops an output signal which serves as the input to counter 18. Thus, both signals necessary for the speed and distance measurements are developed by a single multivibrator.

Numerous alterations and modifications of the embodiments described will no doubt become apparent to those skilled in the art after having read the above disclosure. It is therefore intended that the following claims be interpreted to cover all such alterations and modifications as fall within the true spirit and scope of the invention.

What is claimed is:

1. A combination speedometer/odometer apparatus for displaying the speed of a vehicle and the distance the vehicle has traveled comprising:
   speed pick-up means for detecting the speed of the vehicle and for developing a first voltage signal including voltage spikes, said voltage spikes occurring at a frequency proportional to the speed of the vehicle;
   pulse generating means responsive to said voltage spikes and operative to develop a voltage pulse time-coincident with each said spike, said pulses having a predetermined duration;
   signal generating means responsive to said pulses and operative to develop a speed signal having a first plurality of bursts with a first plurality of voltage impulses, the number of said first bursts being proportional to the speed of the vehicle, and a distance signal having a second plurality of bursts with a second plurality of voltage impulses, the number of said second bursts being proportional to the total distance the vehicle has traveled;
   gate means having a first input for receiving said pulses, a second input and an output, said gate means being operative to block said voltage pulse at said first input whenever a timing signal is present at said second input, and to pass said voltage pulse to said output in the absence of said timing signal;
   timing signal generating means responsive to the voltage pulse passed through said gate means and operative to develop said timing signal, said timing signal having a leading edge, a predetermined duration and a trailing edge;
   signal differentiator means responsive to said timing signal and operative to develop a reset signal coincident with said leading edge and a strobe signal coincident with said trailing edge;
   first counter means responsive to said reset signal and operative to count said first impulses;
   second counter means for counting said second impulses; and
   display means responsive to said strobe signal and operative to alternatively display the count outputs of said first and second counter means, the output of said first counter means being indicative of the speed of the vehicle and the output of said second counter means being indicative of the distance the vehicle has traveled.

2. A combination speedometer/odometer apparatus as recited in claim 1 wherein said timing signal means includes capacitive means and resistive means for together determining the duration of said timing signal.

3. A combination speedometer/odometer apparatus as recited in claim 2 wherein said timing signal means further includes a monostable multivibrator for developing said timing signal.

4. A combination speedometer/odometer apparatus as recited in claim 1 wherein said display means includes a liquid crystal display for displaying either speed or distance in a set of three numerical digits.

5. A combination speedometer/odometer apparatus as recited in claim 4 wherein said display means further includes multiplexer means and a selector having a first position and a second position, said multiplexer means being responsive to said switch and operative to cause said liquid crystal display to display speed when said switch is in said first position, and responsive to said switch and operative to cause said liquid crystal display to display distance when said switch is in said second position.

6. A combination speedometer/odometer apparatus as recited in claim 5 wherein said display means further includes decoder driver means, level shifter means, and display frequency oscillator means, said decoder driver means being responsive to said multiplexer means, said level shifter means, said oscillator means and said strobe signal and operative to activate said liquid crystal display.

7. A combination speedometer/odometer apparatus as recited in claim 1 wherein said signal generating means includes a first multivibrator and a second multivibrator responsive to said pulses and operative to develop said speed signal and said distance signal, respectively.

8. A combination speedometer/odometer apparatus as recited in claim 7 wherein said speed pick-up means includes a plurality of magnets attached to a wheel of the vehicle and an electrical coil disposed in a stationary position proximate said magnets whereby one of said voltage spikes is generated in said coil as each of said magnets passes by said coil.

9. A combination speedometer/odometer apparatus as recited in claim 7 wherein said pulse generating means includes a filter, an amplifier and a pulse shaper for converting said voltage spikes into said voltage pulses.

10. A combination speedometer/odometer apparatus as recited in claim 7 and further comprising an odometer reset means for resetting said second counter means to a zero count state for initiating a distance measurement.

* * * * *